UNITED STATES PATENT OFFICE.

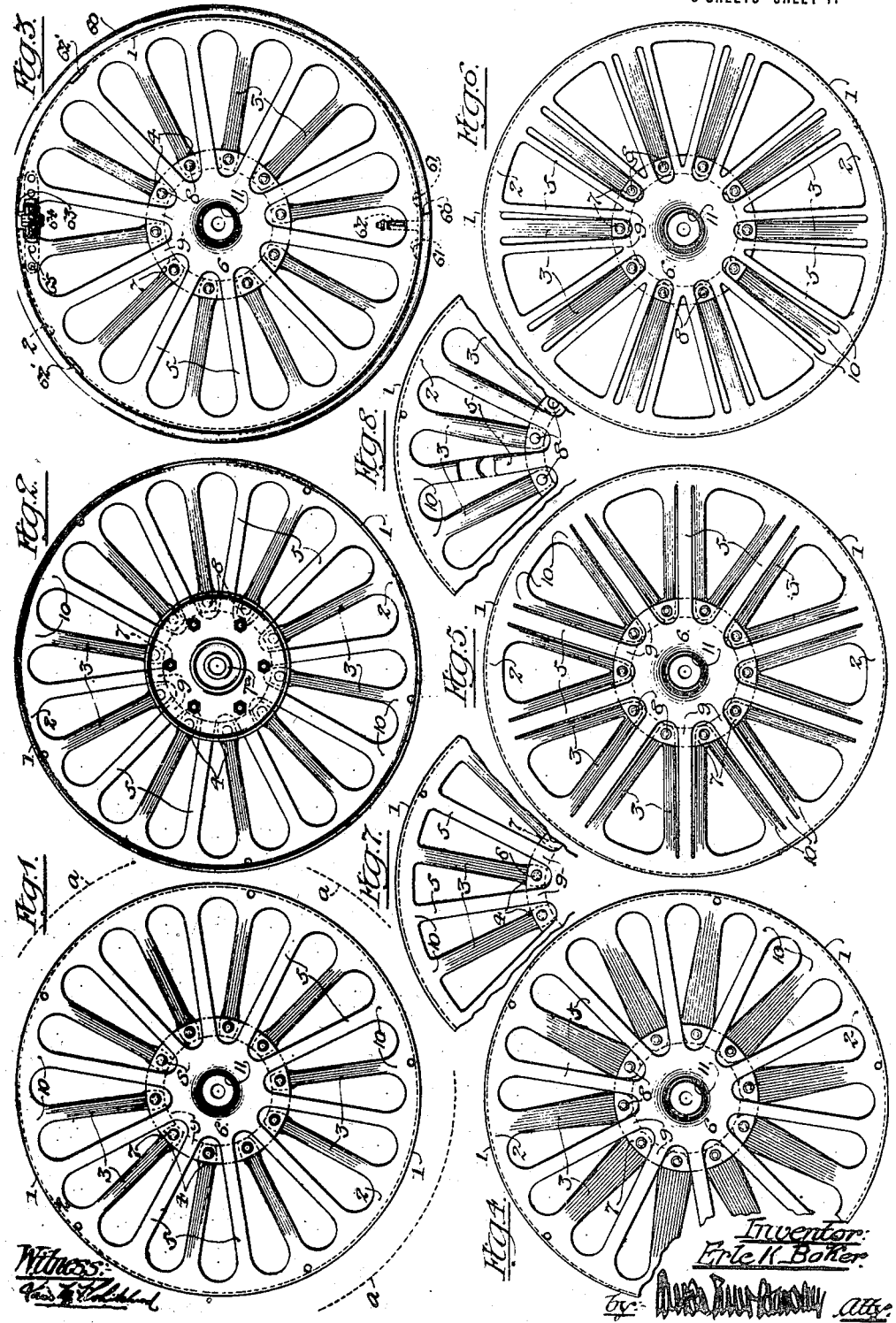

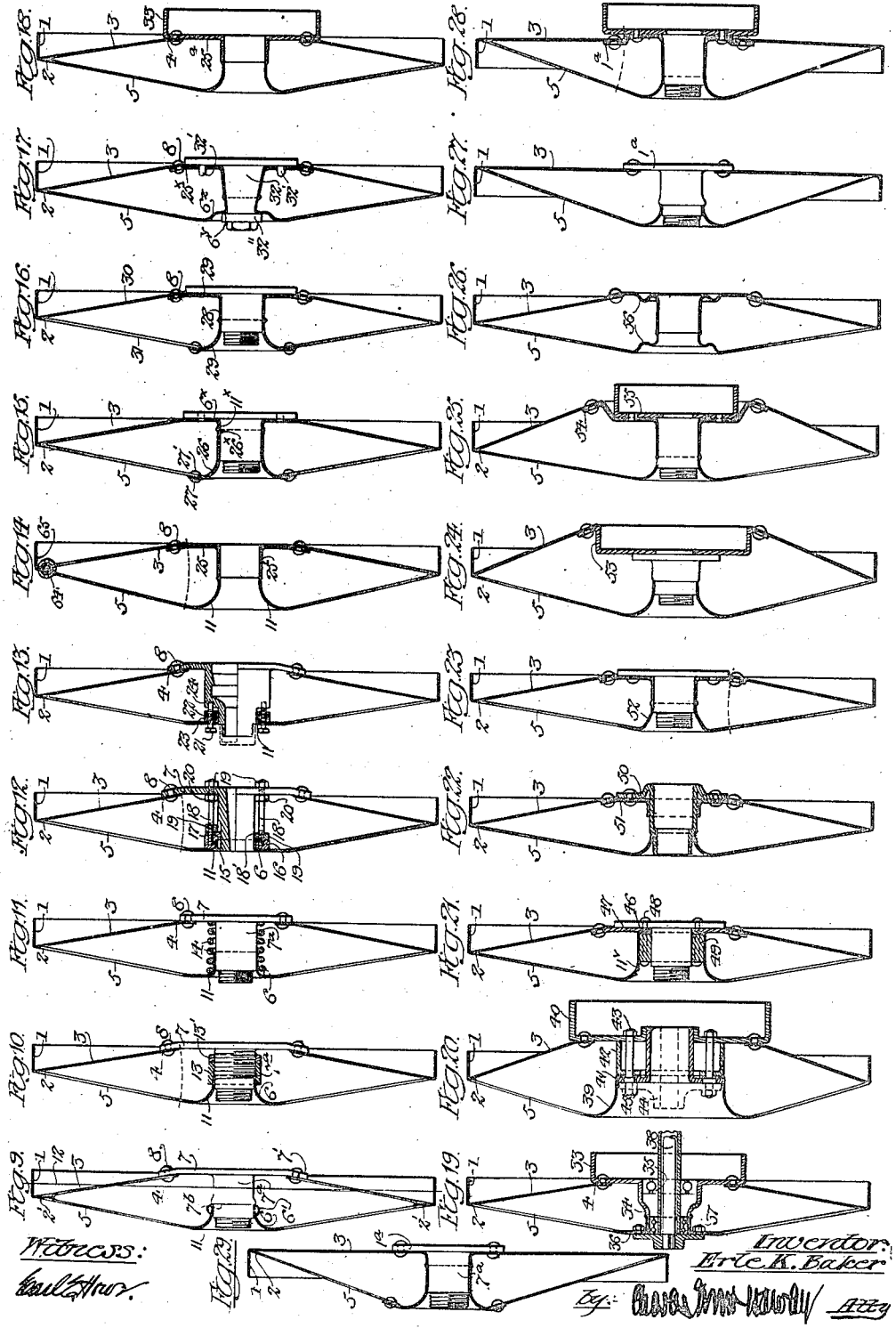

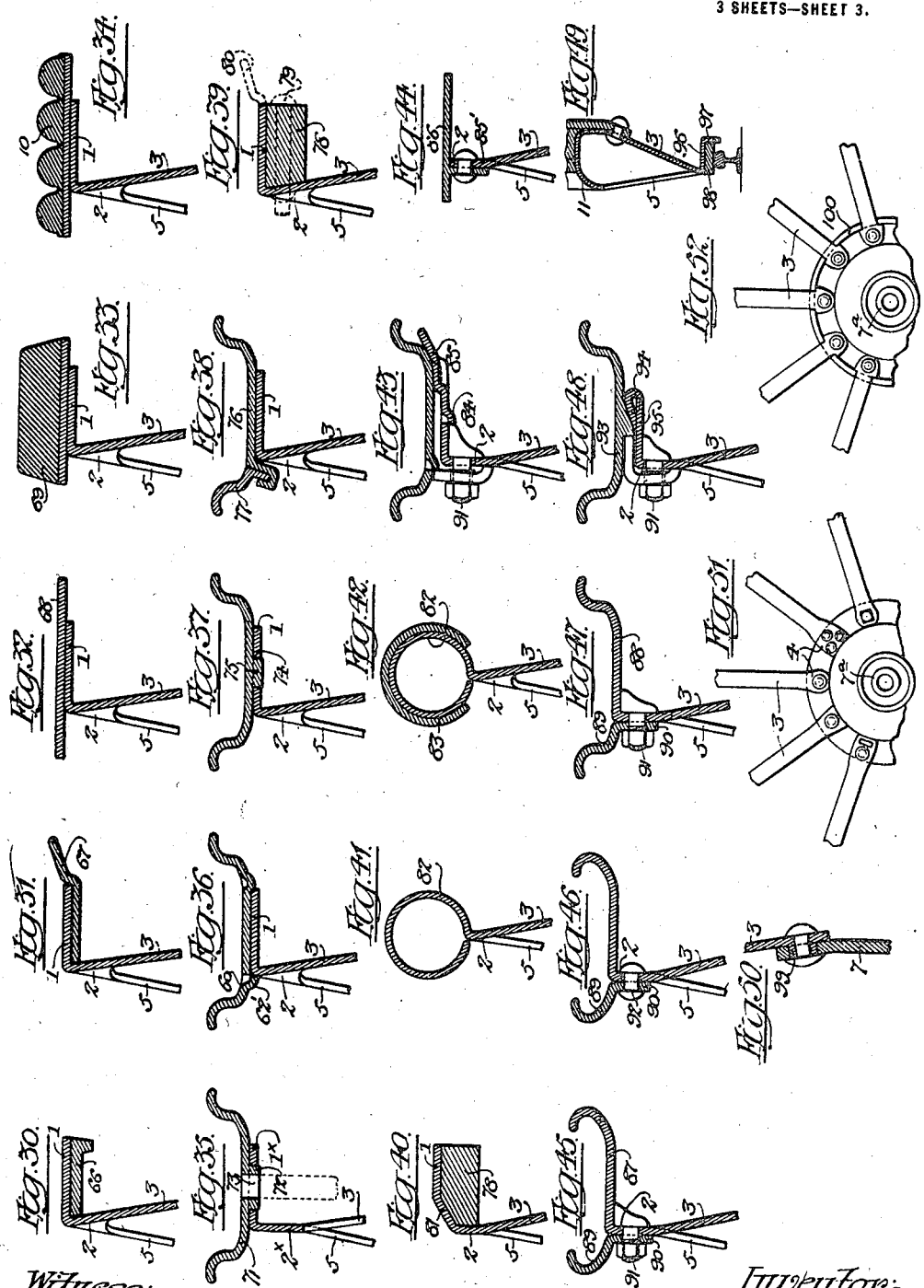

ERLE KING BAKER, OF CHICAGO, ILLINOIS, ASSIGNOR TO BAKER WHEEL & RIM COMPANY, OF CHICAGO, ILLINOIS, A CORPORATION OF ILLINOIS.

WHEEL.

1,320,999.      Specification of Letters Patent.      Patented Nov. 4, 1919.

Application filed November 11, 1916. Serial No. 130,773.

*To all whom it may concern:*

Be it known that I, ERLE KING BAKER, a citizen of the United States, and a resident of Chicago, Cook county, Illinois, have invented certain new and useful Improvements in and for Wheels, of which the following is a specification.

My invention relates to improvements in and upon wheels, more especially motor vehicle wheels;—and its object is to so modify the construction, design and distribution of parts that they may be made of sheet material, and greatly improved in strength, resilience, efficiency, stability and durability; and shall be safer, of less weight, of less cost, silent, and easier to keep clean. A further object is to provide a wheel construction which shall lend itself to beauty of design, and any desired finish.

The invention resides, primarily, in a resilient wheel of the suspension type, mainly formed or stamped from a single sheet or plate of material (such as sheet steel), and which, by various changes in configuration may be presented in many forms and designs, and adapted to many different uses. The invention also consists in details of design, construction, and combination of parts, and in certain processes of manufacture, all as hereinafter described and particularly pointed out in the appended claims.

The invention will be understood on reference to the accompanying drawings, which form part of this specification and in which, Figure 1 is the obverse elevation of a wheel embodying my invention. Fig. 2 is a reverse view thereof. Fig. 3 depicts the wheel as when adapted to be expanded and contracted, for the easy mounting and demounting of a tire or rim. Figs. 4 to 8 inclusive illustrate modified configurations and indicate the extent to which the design of the wheel may be changed in the process of punching and stamping it from the primary sheet of material. Figs. 9 to 29 inclusive are axial cross-sections each differing from the others and indicating the extensive ramifications of my invention. In these figures I have shown the wheels provided with typical cylindrical peripheries. Figs. 30 to 49 inclusive represent various peripheral formations and equipments by which the wheels are adapted to different uses. Figs. 50, 51 and 52 represent different ways of attaching the free spokes to the hub portions.

Because of its low cost and its excellent qualities, I prefer sheet steel (either hot rolled or cold rolled) as the material from which my wheel shall be made. The thickness of the sheet is proportioned to the service which the wheel is to perform. I regard one inch thickness as the maximum called for by the most exacting uses. In making automobile wheels (as distinguished from truck wheels) I prefer sheet steel of about one-eighth inch in thickness, as that material yields a wheel of approximately the same weight as a corresponding wooden artillery wheel and of much greater strength and stability. The diameter, the hub length (within reasonable limits), the width of the peripheral flanges and the width of the spokes may be varied to suit load and service requirements and the designer's conception of proportions and beauty. Most of the exemplary wheels herein shown are motor vehicle wheels of familiar diameters and hub lengths.

As indicated by the dotted line, *a*, in Fig. 1, the wheel is stamped, drawn, and punched from a circular disk of sheet metal. It comprises a peripheral flange, 1, the felly-like flange or web, 2, (hereinafter called fellyweb), the inner spokes, 3, (having preferably enlarged free ends, 4) the outer spokes, 5, and the resilient center portion 6, all formed from the one piece;—plus, the hubportion, 7, and the fastenings, 8, by which the spoke ends, 4, are attached thereto. The single piece is further characterized by the gusset-like spoke-roots, 9, which integrally unite, and broaden the connection between, the inner ends of outer spokes, 5, and the resilient center, 6; and is also characterized by the spoke-roots, 10, which similarly unite the felly-web, 2, and the outer end of each of the spokes, 3 and 5. The single piece is further characterized by an inward embossment, 11 (such as shown in Fig. 9) formed with and from the center, 6, and constituting a portion of or containing the hub, as hereinafter explained.

As shown in Figs. 1 to 8, the wheel spokes may be truly radial, or may be tangential, or may be both radial and tangential; according to the shapes of the punching dies which I use. In other words, the wheel is very flexible as to design or appearance. But through all runs the general spirit of the invention, whereby the wheel is given the qualities set out in the beginning of this specification.

As will be explained, in connection with the sectional views, the spokes 3 and 5 diverge from the felly-web; or to be more exact, usually diverge from the points of juncture with the peripheral flange, 1. The inner ends of the spokes, 3 and 5 (where they join the hub) are as widely separated as may be required to give the wheel the lateral or axial strength necessitated by the use to which it is to be put.

To give a better idea of the actual spoke-proportions, I may explain that the wheels which I have thus far made have spokes which are approximately three-fourths of an inch in width, and one-eighth of an inch in thickness.

The best mechanical results, and the best appearances, are secured where the spokes are flat in both longitudinal and transverse cross-sections.

Nevertheless, my invention comprehends either, or both, the lateral and longitudinal shaping of the spokes (as indicated in Fig. 7) though at the present time I regard as objectionable any tampering with the natural flat shape of the spokes. Resilience is not so much required in the spokes themselves, as in the portions of the wheel to which the spokes are rooted, webbed or gusseted.

At this point it should be understood that the gusseting, (the word seems appropriate to the integral formation) not only properly "roots" the spokes to the resilient center and to the peripheral flange, but has the further advantage of strengthening the wheel against the relative rotation of its center and periphery. It also obviates any tendency of the spokes to twist at the points of attachment to the felly-web, and the center. And furthermore by gusseting the spoke ends, as shown, the alternate spokes (inner and outer) cause substantially equalized strains upon the peripheral flange and felly web while the pull of the spokes thus strengthened tends to, and, in fact, actually deflects the felly-web. There is between each two spokes, a felly-web portion which is perpendicular to the peripheral flange.

Each spoke may be single, as in Figs. 1, 2, 3, 4, 7, and 8; or, as indicated in Figs. 5 and 6, the spokes may be plural. I find that all the illustrated dispositions of the metal yield wheels of the remarkable and superior qualities indicated. A feature of the plural-spoke designs is that they readily lend themselves to the tangential formation and arrangement of the spokes. At present I prefer the simple, radial-spoke arrangement, shown in Figs. 1 to 3; and variously modified in Figs. 7 and 8 and as modified in Fig. 4, to provide heavier inner spokes. This last is advantageous in some driving wheels.

I have thus elaborated the showing of the "face designs" in order to indicate the latitude which my invention accords in matter of lines, angles, and curves, to express and embody different combinations of beauty and utility.

The great strength and comparative lightness of the wheel are so apparent upon its face that no more need be said on those points. The absence of all joints except the fastenings 8 (which indeed may be welds) makes it clear that the wheel cannot become loose or squeaky. The flat, plain surfaces and the formation of the felly make the wheel easy to clean, and, as will be understood, on reference to the sectional views the surfaces upon the hub and between the inner ends of the spokes are freely accessible, the openings between the spokes being amply large to admit the hands and cleaning implements.

As made clearly evident by Figs. 9 to 29, my invention is quite as submissive to modification in matter of its hub-construction, and cross sectional forms, as it is in the matter of its "face" design.

In all these figures (9 to 29) the peripheral flange, 1, of the wheel is shown of cylindrical form, and of a proportional width sufficient for motor vehicle use. I shall hereinafter refer to the remaining figures of the drawing and show how the periphery of the wheel may be variously formed and equipped; to suit it to different purposes and uses. I shall also again refer to Fig. 3 in describing one construction which is peculiarly suited for use with demountable tire carrying rims.

The simplest form of my invention may be said to comprise the one-piece wheel proper plus a hub portion on which the wheel proper is mounted; as shown, for example, in Figs. 9 and 14. In Fig. 9 the wheel is shown to include the vehicle hub whereas in Fig. 14 the hub portion is a part of the wheel itself, i. e., the wheel is completely self-contained, ready to be placed upon the hub which is found on the vehicle. In practice the self-contained wheel may be permanently secured upon the vehicle hub or may be "demountably" held thereon as desired. As shown in Fig. 9, the wheel includes the vehicle hub in its make up, the center of the hub being formed to fit the individual axle of the vehicle to which it is appropriated. In forming wheels in accordance with the idea expressed in Fig. 14 I am only concerned with the external dimensions of a hub proper already a part of the vehicle. As shown, for example, in Figs. 18 and 19, the self-contained wheel, if intended as a driving wheel, may also integrally include a brake-drum-forming part or flange.

Corresponding parts are indicated by the same reference numerals in Figs. 1 and 9. As shown in Fig. 9, the outer spokes, 5, join, and draw upon, the peripheral flange 1, at an obtuse angle thereto. The inner spokes, 3, join, and draw upon, the peripheral flange at an acute angle thereto. Fig. 9 also discloses the perpendicular portion, 2', of the felly web, 2. As before stated, the free ends, 4, of the spokes, 3, are fastened to the hub portion, 7.

In the case of Fig. 9, the hub-portion, 7, is the back flange of the vehicle hub, 7$^a$, and its edge, 7', is beveled, or made conical, to correspond to the inclination of the spokes, 3. The outer end of the barrel of the hub, 7$^a$, is reduced in diameter, and is thus provided with an abrupt shoulder, 7$^b$. It will now be noted that the central portion, 6, of the wheel body is pressed inwardly, to form the embossment, 11. In the process, the central part is provided with a uniform curve in cross section (as well shown in Fig. 9) and also the embossment is exactly sized to fit the reduced end of the hub, 7$^a$. The inner end of the embossment, therefore, becomes a bearing sleeve which tightly fits the hub, 7$^a$, and squarely abuts against the shoulder, 7$^b$. The assembling of the complete wheel, as shown in Fig. 9, consists in placing the reduced end of the hub, 7$^a$, within the embossment or central sleeve, 11, and then securing the spoke ends, 4, to the conical flange of the hub portion, 7.

The fastenings, 8, in this case (Fig. 9) are rivets. The rivet holes in the conical flange, 7', and in the spoke ends, 4, are positioned so that they do not register when the wheel body and hub are assembled as described. Instead the holes in the spoke ends are slightly farther from the wheel center. Hence, when the rivets are thrust through corresponding holes and riveted home the inner and outer spokes are forcibly separated or spread apart and in this manner the wheel is placed under tension, it being understood that the abutment, 11, cannot follow the pull upon the spokes, 3, by reason of the engagement of said abutment with the spacing shoulder, 7$^b$. The integral abutment, 11, and the outwardly flared center portion, 6, constitute a resilient curved and somewhat elastic web between the hub and the spokes, 5; a condition having many advantages other than merely good appearance. By axially pressing the periphery of the wheel and the hub in opposite directions the wheel may be sprung sufficiently to enable the rivets. 8, to be secured without special effort. But the important fact about the flaring or curved center wheel, 6, is that it affords a major lateral resilience in the wheel whereby the latter is made to act after the manner of a dished artillery wheel. To avoid possible upsetting or stretching of the sleeve, 11, I may either turn it upon itself or fit it with a reinforcing ring, 6'.

I prefer that the position of the felly web shall be at the extreme outer edge of the peripheral flange, and that it shall thus be conveniently positioned substantially midway between the planes which include the inner ends of the spokes 3 and 5, respectively. Thereby, the angles of the inner and outer spokes are made substantially equal with respect to the plane of the felly web. I call attention to the fact that I secure this result without shifting the middle plane of the wheel out of its common relation to the hub and axle parts. It is well known that most vehicle wheels, and especially automobiles, are designed with axles of a definite length with respect to the distance between the tread centers of the wheels belonging thereto. It is also well known that the inner hub flanges of ordinary wheels and the middle planes of such wheels are thus definitely positioned or located; and by reason of long established custom, the distance between the hub flange and the central plane of the wheel has been fixed to equal approximately one-half the thickness of ordinary wooden wheel spokes. From this it follows that the outer portion of the hub is much longer than the inner portion thereof. In Fig. 9 I have indicated the middle plane of the wheel by means of the line, 12, and it will be seen that my wheel construction permits this plane to be maintained at the middle of the peripheral flange, 1. In other words, though the construction of my wheel widely differs from the construction of wooden wheels having felly bands or fixed rims or tires of the same width as the flange, 1, it nevertheless permits the flange, 1, (to occupy with respect to the remainder of the chassis) the identical position formerly occupied by the tire or felly band of a wooden or wire wheel. This result is chiefly attributable to my use of a peripheral flange, 1, corresponding to the felly bands in ordinary use, and to the positioning of the felly web, 2', at the outer edge of said flange, 1. A further advantage of the construction is that when a pneumatic tire and rim are positioned on the flange, 1, the valve stem may extend through an opening in the flange, 1, at a middle point therein and is not interfered with by the felly-web or by the spokes. Hence neither the presence of the valve stem, nor the presence of rim driving connections necessitate any special formation of the felly.

It will be noted that the bulge of the resilient center, 6, does not interfere with the usual formation of the outer end of the hub, 7ª, which in practice is furnished with the usual equipment and hub cap. Also the vehicle hub may be of any desired diameter and length, it being clear that the embossment may be either large or small and may be seated on any desired part of the hub barrel.

It will now be clear that all parts of the assembled wheel are held constantly under tension within the peripheral flange or fixed rim, 1, hence the wheel properly may be termed a suspension wheel, though its substantial spokes give it much of the appearance of a stout artillery wheel.

As a substitute for the above described methods of tensioning the wheel I sometimes construct the same, as shown in Fig. 10. The difference resides in two particulars. The spoke ends, 4, instead of being fastened on the outer surface of the hub flange, are fastened to the back or inner surface thereof, with a marked improvement in appearance, and making the wheel easier to clean. And second the hub barrel, 7ª, is threaded and carries a threaded collar, 13, the outer end of which is recessed to receive the embossment or sleeve, 11. The collar or nut is constructed to be turned by means of a spanner wrench; and, after the spoke ends, 4, have been secured, this collar or nut, 13, is screwed outwardly on the hub, thus distending the front of the wheel and separating the spokes, 3 and 5, as required to uniformly tension the wheel. A lock-nut, 13', may be provided back of the nut, 13, or the thread on the hub may be battered, to lock the nut, 13, after adjustment. One advantage of this construction is that the wheel may be retensioned at any time. A further advantage is that the overhanging nut binds the sleeve, 11, upon the hub and prevents the stretching of the sleeve, being in this respect a substitute for the reinforcement, 6', shown in Fig. 9.

A modified tensioning arrangement appears in Fig. 11, being a compression spring, 14, which is interposed between the hub flange and the center, 6. In this construction I prefer to make a sharper curve or angle between the sleeve, 11, and the face of the resilient center, 6. But, it will be obvious that the wheel center and embossment may be of the same form shown in Fig. 9. The spring is compressed at the moment of riveting, or bolting, the free ends of the back spokes, 3, and is then liberated. Thereafter it serves to maintain the tension of the wheel. It also, incidentally, serves to absorb abnormal axial shocks upon the outer side of the wheel.

In Figs. 12 and 13 I have shown two other methods and devices for tensioning the wheel initially; and, if desired, afterward. In Fig. 12, the embossment, 11, still fits the end of the hub, and the hub is provided with an external keyway, 15. A ring, 16, is fixed upon the embossment and against the part, 6. This ring has a fixed key, 17, slidable in the groove 15 to prevent rotation on the hub. Spaced in the ring, 16, are a number of threaded bolt holes. These are occupied by bolts, 18, threaded within the ring, 16, and preferably having threaded inner ends, 18', for the lock-nuts, 19. Fixed intermediate heads or collars, 20, are formed on the bolts and bear against the outer side of the hub flange, 7. These collars are preferably polygonal nuts to which a wrench may be applied. When the lock-nuts, 19, are loosened the bolts, 18, may be turned, to either slacken, or tighten, and uniformly tension, and true, the wheel upon the hub. When the operation is finished the lock-nuts, 19, are tightened. Upon driving wheels, the lock-nuts, 19, may serve to secure the usual brake drum.

The tensioning and wheel-truing arrangement, as shown in Fig. 13, is of substantially the same kind, but admits of a better shaped hub, and has the advantage of presenting the heads, 21, of the adjusting bolts on the outer face of the wheel center, where they are more conveniently accessible. In this case the bolts, 22, pass through threaded openings in the ring, 23. The ends of the bolts are smooth and are merely socketed in the shoulder, 24, of the hub.

Both arrangements shown in Figs. 12 and 13, yield the advantage of fixing the outer side of the wheel upon the hub. While a turning movement of the sleeve or embossment, 11, upon the hub is unlikely even in the case of Figs. 9, 10, and 11, I prefer to fasten the front and back of the wheel together in some such manner as indicated in Figs. 12 and 13.

However, the fastening together of the front and back of the wheel, that is, the securing of the outer and inner spokes so that they shall surely rotate together without back-lash, may be accomplished in a structure of less weight, of lower cost, and of better appearance, than indicated in Figs. 12 and 13. The better way is indicated in Fig. 14, and is a step which I adopt for the purpose of making the wheel complete, i. e., self-contained, without using the vehicle hub as a permanent part of the wheel. As well shown, I provide a substitute for the hub barrel and flange above described. The purpose of the substitute is to complete a hollow shell-like hub and provide mean for spacing apart the spokes. This substitute is a pressed steel member, 25, formed preferably of metal somewhat thicker than that constituting the body of the wheel and comprising a barrel portion and an integral back flange portion, 25'. The flange, 25, provides the fastenings for the inner spokes, 3, of the wheel. The hub portion corresponds in diameter to the sleeve or embossment, 11, of the wheel and abuts the same. By making the embossment, and the hub portion, 25, of proper length, the wheel may be tensioned in the process of assemblage, as before described; though there is no vehicle hub then present. The flange, 25', contains a number of holes to receive the hub bolts used for finally securing a vehicle hub in the hub shell or tube thus formed by the parts 11 and 25. In practice I prefer to electrically weld the parts 11 and 25. And I prefer to initially form these parts of less than the final diameter, and to tension the wheel by expanding them after they are welded together. The operation of expanding them increases their joint length and thus spreads the spokes thereof. The resulting tension is proportionate to the extent to which the hollow hub is lengthened.

A slight modification is shown in Fig. 15. In that case the integral wheel center, $6^x$, is formed at the inner side of the wheel and the flared resilient center is constituted by a hub member, 26. As before, I prefer that the sleeve portions ($11^x$ and $26^x$) shall be welded electrically, in order that the wheel as a whole shall constitute, finally, a unitary or single-piece article. An objection to the term "single-piece" in this connection may be urged on account of the presence of the rivets, 27', which secure the free ends of the front spokes to the outwardly turned flange of the part, 26. But the term may be made accurately appropriate by electrically welding the spokes to said flange; which I propose to do not only in this case but in other of the cases illustrated. The best appearance is insured by placing the spoke ends against the inner surface of the flange, 27.

A similar modification is illustrated in Fig. 16 where I omit the integral wheel center and form the wheel center or hub shell of the wheel in a single tube, 28, having both inner and outer resilient flanges, 29, to which respectively are secured the (in this instance) free ends of both inner and outer spokes, 30 and 31.

In Fig. 17 I have illustrated a desirable modification of the wheels shown in Figs. 14, 15 and 16, particularly when they are to be used as "demountable" wheels. In Fig. 17, 32 represents a vehicle hub, such as is usually employed for demountable wheels. The wheel illustrated is of essentially the same form as shown in Fig. 14, having a part, $25^x$, like the part, 25, but containing, instead of the bolt holes, a number of holes which receive the interlocking studs, 32', of the vehicle hub. In this instance I prefer to increase the resilient qualities of the wheel and provide a bearing shoulder for the wheel-locking hub-cap, 32″, by forming, first an abrupt shoulder, $6^y$, and then a flaring part, $6^z$, in the integral hub center.

Fig. 18 illustrates an important development of my invention in which a brake drum is combined with a self-contained wheel of the general character of that shown in Fig. 14, the only addition being a flange, 33, upon the hub stamping or pressed piece, $25^a$. This flange performs the functions of a brake drum. The appearance is as though the free ends, 4, of the spokes, 3, were riveted to the outer face of the brake drum. With this construction the axle bearings may be placed within the integral hub, or a complete hub may be fitted therein after the manner of Figs. 16 and 17.

The fitting of bearings within the integral hub of the wheel, and the adaptation thereof to a floating axle, find illustration in Fig. 19. The weld-completed integral hub, 34, is shaped in any desired manner, as demanded by the dimensions and positions of the anti-friction bearings 35. Though this wheel may be made with a broadly flaring resilient center, as shown in Fig. 9, or as in Fig. 17, I have here illustrated it as provided with a flat surface, 36, which contains holes for the dental pins or bolts, 37, of the part which connects the wheel to the floating axle, 38.

A further modification of the rear wheel construction is depicted in Fig. 20, the chief difference there, being the wider spread of the spokes and the enlargement of the resilient center, 39, to accommodate a vehicle hub of present well known proportions. The rigid connection between the hub and the wheel is made as follows: The inner or back spokes, 3, are attached to the brake drum, 40. The resilient center terminates in a vertical flange, 41. A spacing ring, 42, is placed between the parts 40 and 41. The usual bolts, 43, are then passed through the axle-containing plate, 44, the hub flange, 45, and the parts 41, 42, and 40, clamping all thereof together.

A wheel which is similarly characterized by a vertical flange, 46, at the terminus of the embossment, $11^v$, is shown in Fig. 21. In this, the resilient center is likewise enlarged and the flanges, 46 and 47, are clamped by bolts, 48, which extend through a filler ring 49, that serves to carry the long sleeve-like center formed by the exaggerated embossment, $11^v$.

Fig. 22 illustrates the adaptation of my invention to a conventional front hub, 50. The typical central embossment abuts a shoulder on the pressed steel hub, 50, and the free spokes are attached directly to the flange of the hub or to an added ring, 51, which is held by the usual hub bolts.

The wheel shown in Fig. 23 differs from the others in having a straight-line flare, 52, in its resilient center.

In Fig. 24 I have illustrated a construction of the hub drum flange, 53, which provides an external attachment for the inner spokes and also increases the spread of the spokes. It seems unnecessary to illustrate the several different hub designs which may be utilized with this form of spoke-attaching flange on the brake drum.

The wheel shown in Fig. 25 differs from that of Fig. 24 in having the spoke attachment flange, 54, independent of the brake drum, 55, and hence equally applicable to both the steering and driving wheels of a motor vehicle.

That further resilience may be obtained in the central flange of the wheel is indicated by the additional bulges, 56, illustrated in Fig. 26.

I do not wish it understood that my invention is restricted to wheel designs in which the spokes are joined only to the outer edge of the peripheral or bracing flange of the wheel. For this reason I have shown, in Figs. 27, 28 and 29, three of my wheel constructions in which the spokes are integrally attached to the inner edge of the peripheral flange, 1$^a$. Fig. 27 does not otherwise differ from Fig. 9. Fig. 28 is substantially the same as Figs. 14 and 18 in matter of hub portions. Fig. 29 is comparable to Fig. 15, inasmuch as the integral wheel center is at the inner side of the wheel and the free spokes are bent outwardly. My present judgment is that the wheels shown in Figs. 27, 28 and 29 are not as efficient as the other wheels illustrated, but it is evident that they may be used with advantages equal to wooden and wire wheels.

As before stated, the peripheral flanges of my wheels may be formed in many shapes and equipped with different devices to fit them to a wide range of uses. So various are these forms and equipments that I have deemed it necessary to illustrate a number of them in Figs. 30 to 49 of the drawings.

I shall here refer back to Fig. 3 in which the wheel is shown in combination with a demountable rim, 60. The rim fits the flange, 1. It is circumferentially fixed by driving studs, 61, which extend through holes in said flange. The studs are on opposite sides of the valve stem (62) position; and on opposite sides of the transverse split (60') when that method of making the rim "quickly detachable" is used. Projections, 62, on the rim engage the felly flange, 2, and aline the rim on the wheel. To loosen the rim, 60, as needed before it can be demounted, I contract the periphery of the wheel. Reversely, the rim is tightened by expanding the wheel therein. This I accomplish by forming a gap, 63, in the wheel parts, 1 and 2, and providing in this gap an expanding and contracting device, 64. As shown, I prefer that the expanding and contracting device shall be a right-and-left threaded nut working on two correspondingly threaded studs, 64; projecting from the ends of respective portions of the felly web. The studs have relatively long shanks which are detachably fastened to the felly-web (and if desired to the flange 1) preferably by easily renewable rivets or bolts, 65. The butts of the shanks are preferably notched to receive respective ends of the felly web, so that they may surely aline therewith and assist the holding action of the rivets. As shown, the expanding and contracting device acts longitudinally in the plane of the felly-web; that is, circumferentially with respect to the wheel. The device is worked by means of a wrench or drift pin (not shown) and with the resilient and elastic wheel affords the simplest conceivable means of demountably securing the rims of pneumatic tires and other tires. One secret of the value of the structure lies in the fact that all of the spokes are rooted in a single plane at the periphery of the wheel, which permits them to work circumferentially without detriment to the felly. The spokes being flat and flexible, as well as under tension, do not resist the movement to the point of distortion. The location of the expanding device is also shown in Fig. 14.

Figs. 30 and 31 show metal fellies of two forms, 66 and 67, which I expand and secure within the flanges, 1, of the wheels. The felly, 67, also constitutes a back flange, to receive a demountable rim.

Figs. 32, 33 and 34, respectively, represent flat (68) solid rubber (69), and traction, (70) tires, which are "pressed on" to the wheel flanges, 1.

Fig. 35 discloses a circumferential felly-web, 2$^x$, all of which is perpendicular to the peripheral flange, 1$^x$, the spokes extending inwardly from the inner edge of the web. Incidentally, Fig. 35 discloses the position of a pneumatic tire rim, 71, formed with an integral driving stud, 72, containing a valve stem hole, 73, and by which the rim is coupled to the flange, 1$^x$. Fig. 36 discloses the form and construction of the projections, 62, referred to in the description of Fig. 3. These are the projections which engage the felly-web and they are formed by punching inward a portion of the rim, 60.

In lieu of the projection, 62, I may, as shown in Fig. 37, provide the wheel flanges with holes, 74, to receive interlocking studs, 75, that project from the inner periphery of the demountable rim. It will be understood that with a contracting device, 64, the wheel is so reduced in circumference and diameter as to allow the projections to be placed in and taken from the interlocking holes, 74.

Fig. 38 illustrates the adaptation of my wheels to use with so-called quick detachable demountable rims, typically shown in the part 76, characterized by a detachable flange, 77.

For exacting uses I prefer to equip my wheel with a wooden internal felly, 78, which is pressed within the peripheral flange, 1, of the wheel. It may be there secured by a series of transverse bolts, 79, and when desired these bolts may be used to also retain the clamping devices sometimes employed with demountable rims. In the latter case the peripheral flange is either formed with a back flange extension 80, as shown by dotted lines in Fig. 39, or else the peripheral flange is formed with a circumferential frustum of a cone, 81, as indicated in Fig. 40.

Figs. 41 and 42 represent a peripheral flange, 82, which is substantially circular in cross section. Fig. 42 shows the rolled rim covered with a layer, 83, of rubber or the like. It should be noted that the part, 82, is an integral extension of the felly web and spokes.

Fig. 43 illustrates the manner in which I fasten the rim clamping bolts in the felly web by striking down a part, 84, of the peripheral flange of the wheel. This figure also shows spaced struck-up parts, 85, which serve to center the demountable rim on the wheel. The rim itself and the clamp shown are claimed in an earlier application and need no description here.

Fig. 44 is a modification intended to show that the felly web, 85′, may constitute the peripheral margin of the wheel and may receive a separate flange, 86, either bolted, riveted, or welded thereto.

My wheels very readily lend themselves to integral formation with permanent tire rim parts. This statement is illustrated in Figs. 45, 46 and 47. Figs. 45 and 47 show how the integral peripheral flange, 87, 88, of the wheel may be contrived to take the place of clencher and straight-side rim sections. In both cases the outer flange, 89, of the rim is separate and has a vertical flange, 90, which is secured against the felly web by means of bolts, 91. The flanges, 89, are therefore readily removable. These rim constructions are of the quick detachable type and are peculiarly adapted for use when the wheels are demountable, i. e., made with tubular hub shells and adapted for ready attachment to and detachment from the vehicle hubs. As shown in Fig. 46, the construction may be modified by securing the narrow or outer flange to the body of the wheel by means of a number of rivets or welds, 92. This construction is adapted for standard clencher tires having stretchable base beads.

My peculiar patented neutral plane demountable rims, such as 93, shown in Fig. 48, may be accompanied by forming the peripheral flange of the wheel in such manner as to provide the frustum of a cone, 94. As depicted, this may be done by first forming a wider peripheral flange, 95, and then rolling its free edge back upon itself.

If constructed of heavy sheet metal, my wheels are probably adapted for use as railway car wheels and the like. I have therefore depicted such a construction and use in Fig. 49. In this case the peripheral flange, 96, of the wheel is conveniently provided with a tread flange, 97. The wheel may or may not be provided with an auxiliary tread, 98, as desired.

The spokes which are welded to the hub flanges of the wheel are so intimately united therewith as to defy illustration; but in Figs. 50, 51 and 52 I have shown the several forms of spoke ends and rivet and bolt fastenings which I have found satisfactory. These vary from a simple single rivet up to various forms which are designed to prevent twisting of the spokes upon the hub flange. The rivet may be polygonal or there may be several rivets, or a rivet and a weld, any of which will accomplish the purpose. As shown in Fig. 50, a peculiarly strong connection may be formed by providing a pressed boss, 99, upon the spoke end at the rivet opening, this boss being accommodated in the hub flange and either serving as the connection or being reinforced by a rivet. A desirable construction is shown in Fig. 52 where the part 100 is a circumferential flange on the hub, notched to receive the shanks of the spokes. This construction is of assistance in the assembling of the wheel and adds strength to the rivet fastenings.

The advantages of my invention may be summarized as follows:—The resilience of the wheel prevents too rigid resistance to lateral shocks and stresses. The wheel, weight for weight, is much stronger than the wheels in common use. Being in every case practically, and in several cases actually, a single piece wheel, its parts can not loosen or become squeaky, and it does not present joints which are subject to rust. Being a one-piece wheel it does not deteriorate by usage in bad weather. Every part and surface is accessible and therefore the wheel is easy to surface finish and to clean. The wheel will give good service even when badly damaged by severe accident. Generally speaking the wheel has more elasticity combined with strength than either a wooden artillery wheel or a wire wheel. The wheel, weight for weight, is capable of carrying a heavier load than a wire wheel and a much greater load in comparison with a wooden wheel of equal size and weight, and, as indicated, it is capable of sustaining greater sidewise stresses. The wheel is truly balanced. It is substantially immune from dishing or crushing in either the hardest use or ordinary accidents. It is fully capable of withstanding the twists and tensions of severe strains in the transmission of power. As a necessary consequence of its integrality all its parts are held in proper alinement.

Vibrations are absorbed in the wheel to a great extent and not transmitted to the axles. The wheel obviously reduces the unsuspended load and transmits the load stresses from the axle to the ground contact. If the wheel is fitted with a rubber tire its fatigue is less than any other kind of wheel. For the reasons given the wheel measurably increases the life of tires. By increasing the hub length it is possible to insure all requisites of strength in wheels of large diameter and where the latter are used with pneumatic tires the tire life is of course increased. The relatively flat surfaces and thick edges of the wheel permit it to be finished by any approved metal finishing process and by the application of platings, paints and enamels of all kinds. Not the least of the advantages of my wheel is its obvious beauty. A moment's consideration of the herein described process of manufacture gives assurance that compared with other wheels for the same uses it is much less expensive to manufacture and to finish and the cost of its up-keep is practically *nil.*

Having thus described my invention, I claim as new and desire to secure by Letters Patent:—

1. The herein described tensioned suspension sheet metal wheel having a resilient spoke center.

2. The herein described tensioned suspension sheet metal wheel having a resilient spoke center and spokes, felly web, and flanges integral therewith.

3. The single-piece sheet metal wheel having a peripheral flange and a felly web and spokes integral therewith, and characterized by the described integral gussets each pair of which joins two spokes, and which cause the spokes to draw from the juncture of the said flange and web.

4. The herein described single piece wheel formed from a single piece of metal and ready for application to a hub, comprising a peripheral flange, a radially extending felly web substantially at right angles to said flange, a plurality of spokes extending inwardly from said flange toward the wheel center and there presenting free ends, another plurality of spokes interspaced with the first mentioned spokes, and a curved resilient hub center portion wherein the second set of spokes terminates, said center portion containing a hub receiving opening.

In testimony whereof I have hereunto set my hand this 8th day of November, 1916.

ERLE KING BAKER.